US008412283B2

(12) United States Patent
Li et al.

(10) Patent No.: US 8,412,283 B2
(45) Date of Patent: Apr. 2, 2013

(54) SYSTEM AND METHOD FOR SWITCHING RINGING STATE SESSION WITH CUSTOMIZED ALERTING TONE

(75) Inventors: Shitao Li, Shenzhen (CN); Zhendong Li, Shenzhen (CN)

(73) Assignee: Zte Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/498,400

(22) PCT Filed: Jul. 21, 2010

(86) PCT No.: PCT/CN2010/075359
§ 371 (c)(1),
(2), (4) Date: Mar. 27, 2012

(87) PCT Pub. No.: WO2011/038613
PCT Pub. Date: Apr. 7, 2011

(65) Prior Publication Data
US 2012/0184254 A1    Jul. 19, 2012

(30) Foreign Application Priority Data
Sep. 30, 2009   (CN) .......................... 2009 1 0204403

(51) Int. Cl.
*H04B 1/38* (2006.01)
*H04W 36/00* (2009.01)
*H04W 4/00* (2009.01)
(52) U.S. Cl. .................... 455/567; 455/436; 370/331
(58) Field of Classification Search .......... 455/436–448, 455/567, 432.1; 370/351–356, 400–401, 370/464–467; 379/207.16, 252, 911
See application file for complete search history.

(56) References Cited

U.S. PATENT DOCUMENTS
2009/0122761 A1* 5/2009 Hughes ..................... 370/331

FOREIGN PATENT DOCUMENTS
| CN | 101141794 A | 3/2008 |
| CN | 101494842 A | 7/2009 |
| WO | 2008155621 A2 | 12/2008 |

OTHER PUBLICATIONS
International Search Report for PCT/CN2010/075359 dated Oct. 20, 2010.

* cited by examiner

*Primary Examiner* — Temica M Beamer
*Assistant Examiner* — Joel Ajayi
(74) *Attorney, Agent, or Firm* — Ling Wu; Stephen Yang; Ling and Yang Intellectual Property

(57) ABSTRACT

The present invention provides a system and method for handing over a ringing status session with a color ring back tone, and when the ringing status session with the color ring back tone is handed over, a handover process includes: after an SCC AS receives a handover request, if the SCC AS judges that a session to be handed over is the ringing status session and a forking occurs so that there are a color ring back tone session and a normal media negotiation session, then associating the handover request with the color ring back tone session and the normal media negotiation session; and the SCC AS assisting to complete a handover to the normal media negotiation session and a handover to the color ring back tone session. The present invention completes not only updating to the normal media resource but also updating to the color ring back tone media.

16 Claims, 10 Drawing Sheets

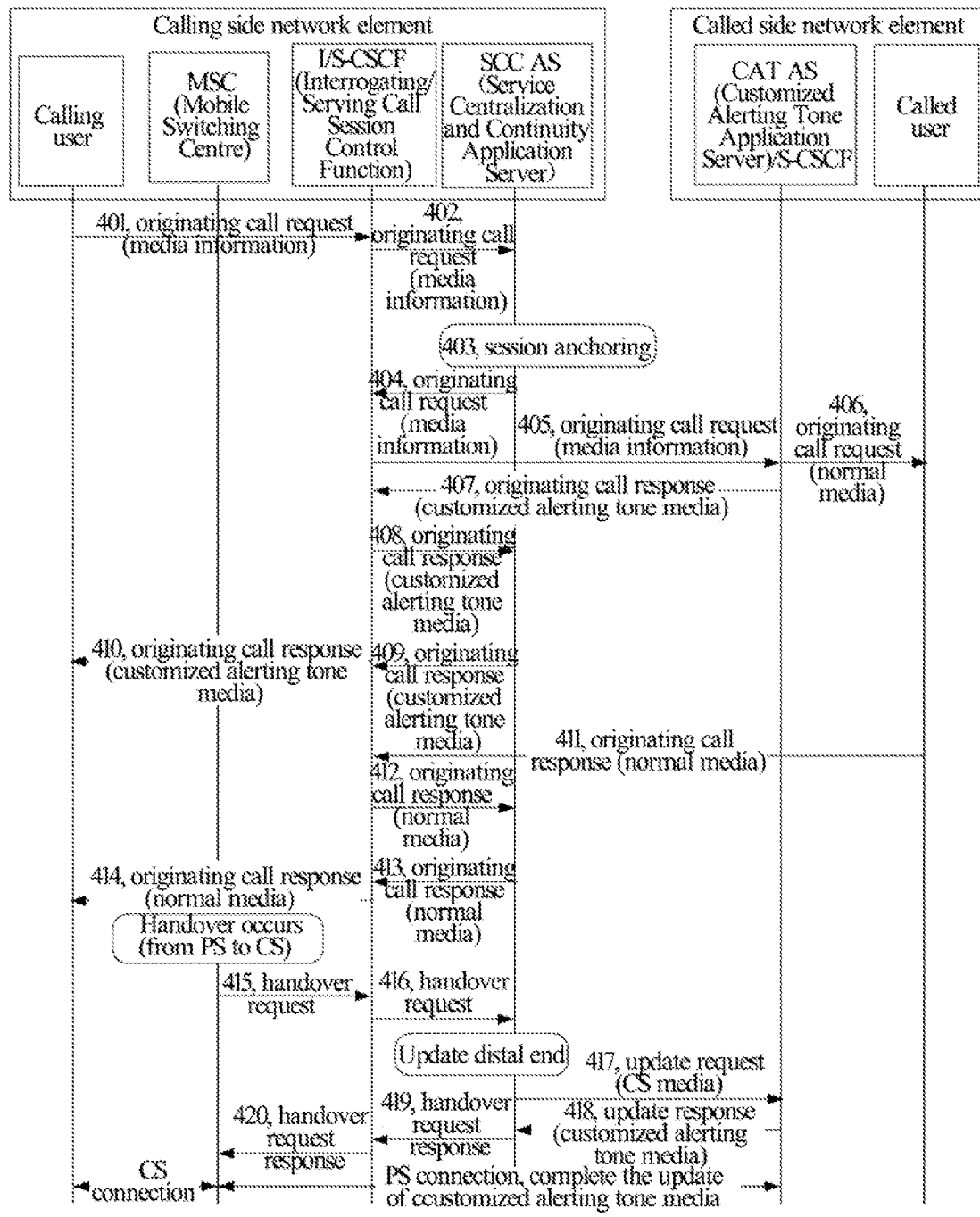
FIG.4-A

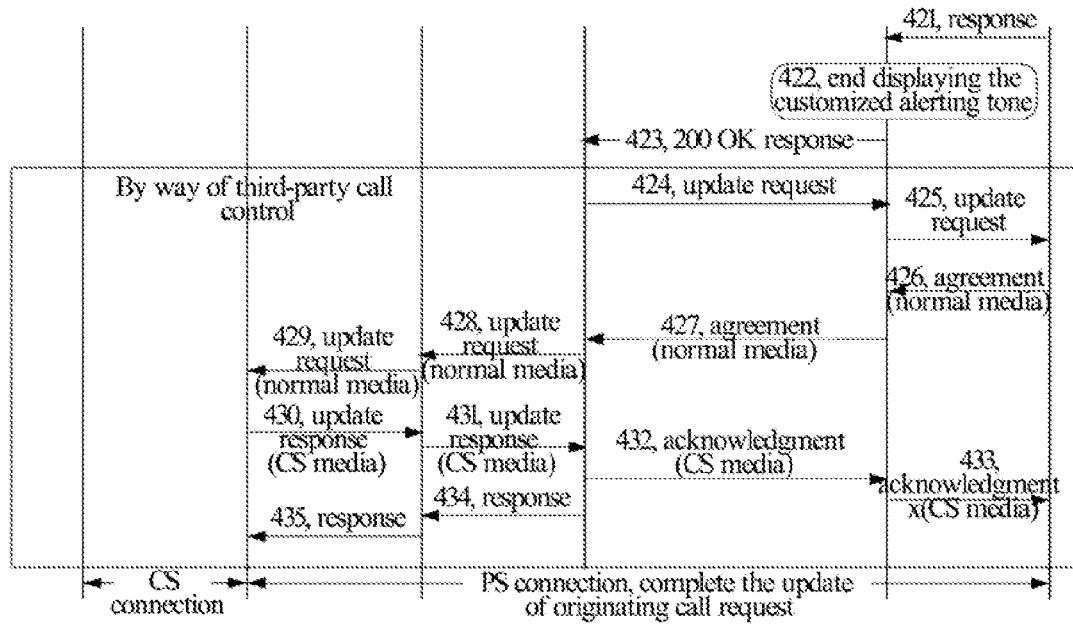
FIG.4-B

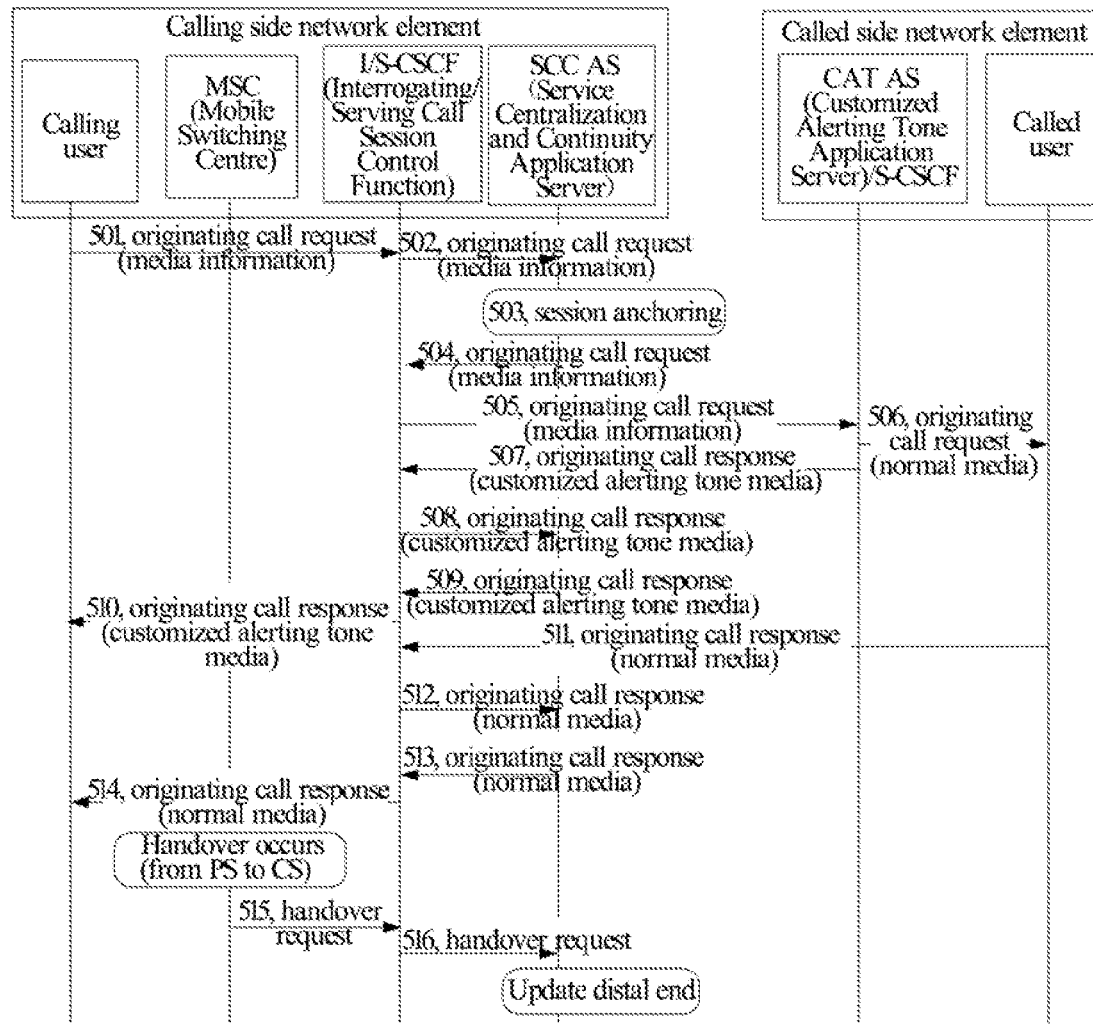
FIG.5-A

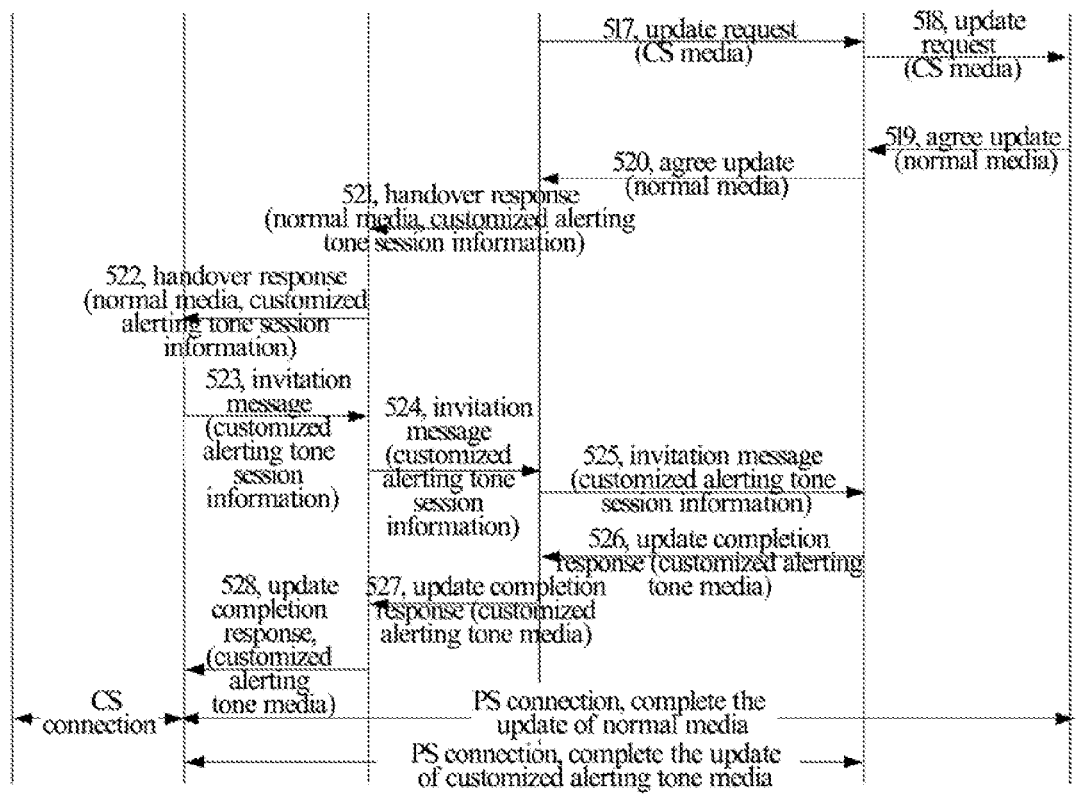
FIG.5-B

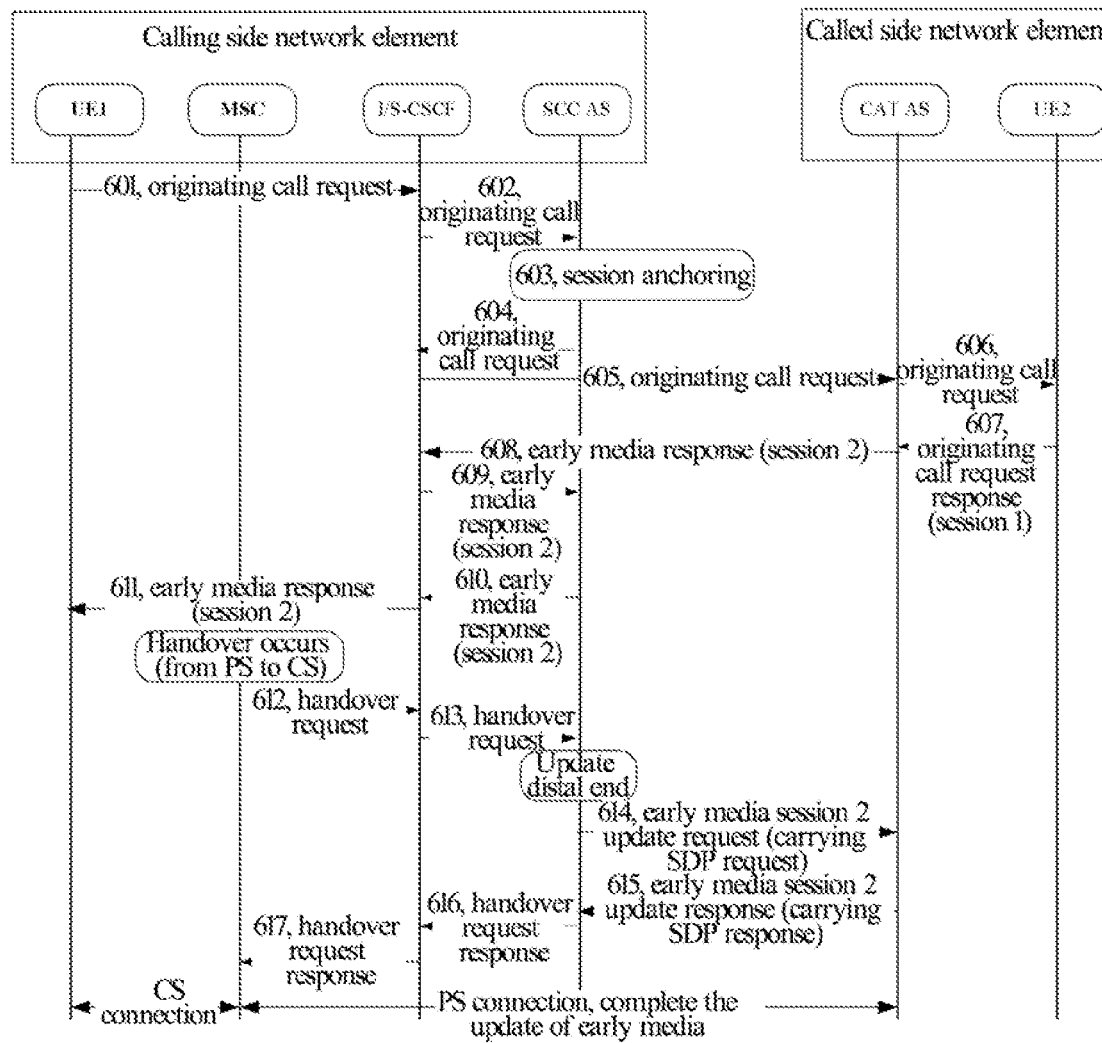
FIG.6-A

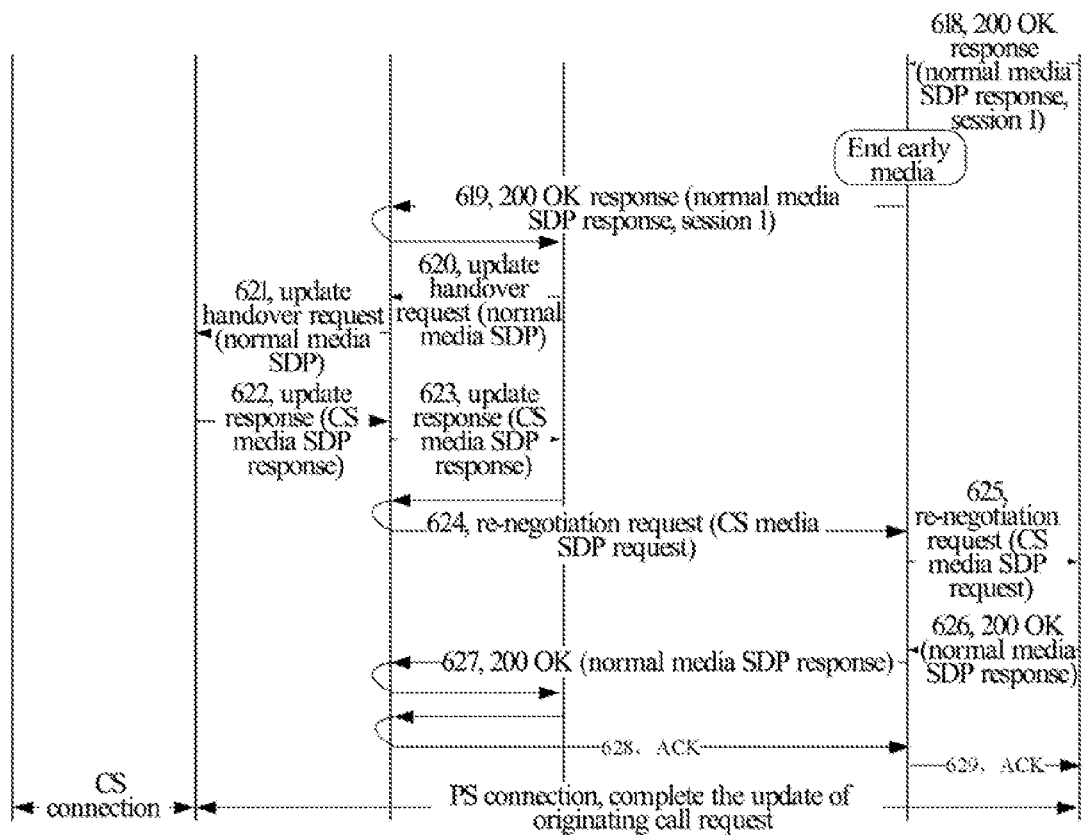
FIG.6-B

SYSTEM AND METHOD FOR SWITCHING RINGING STATE SESSION WITH CUSTOMIZED ALERTING TONE

TECHNICAL FIELD

The present invention relates to the communication field, and more particularly, to a system and method for handing over an alerting phase session with a customized alerting tone.

BACKGROUND OF THE RELATED ART

In the current mobile network, a great many of PS-based (Packet Switch) networks (E-UTRAN, UTRAN-HSPA) are deployed, but their coverage is neither in the whole network nor in the whole area; in some areas signals of the PS network are very poor, and at that time it is necessary to provide a handover from the PS to the traditional CS (Circuit Switch) (such as UTRAN, GERAN) for users, especially when the user is in a session.

FIG. 1 shows a handover mode approved by the standard organization. Firstly, one call is ongoing between UE1 101 and UE2 and this call is on the basis of a PS bearing of an IMS (IP Multimedia Core Network Subsystem), and its session is anchored on an SCC AS (Service Centralization and Continuity Application Server). During the call, the UE1 101 moves to an area with a better CS network coverage; at the time the UE1 101 sends a received signal test report to an MME (Mobility Management Entity) 102 through the original PS network; when the MME 102 receives the test report and knows a handover to be performed from the PS to the CS, it sends a handover request to an MSC (Mobile Switching Centre) 103 which can cover the UE1; the MSC 103 sends the handover request to the IMS network; since the session is anchored on the SCC AS, the SCC AS updates the session with the UE2 after receiving the handover request; after the update of the session is completed, the MSC replies a handover completion response to the MME, and the MME returns the handover completion response to the UE1; and the UE1, after receiving the handover completion response, disconnects the connection with the PS network, and sets a connect with the CS network through the MSC 103. During the whole handover, both the calling user and the called user are not appreciable to the handover.

For an ongoing call, i.e., the calling sends a calling request and the called is in a ringing status and does not respond, and at the time the calling can hear a customized alerting tone customized by the called or a normal ring tone. For such a call, if the handover condition is met, handover can also be performed.

FIG. 2 is a flow chart of handover of an alerting phase session in the related art, including the following steps:

in 201, the UE1 initiates an originating call request to the IMS network through an I-CSCF (Interrogating Call Session Control Function) or an S-CSCF (Serving Call Session Control Function) of a calling network to ask to make a session with the UE2;

in 202, the I-CSCF or the S-CSCF of the calling network, when receiving the originating call request, forwards the originating call request to the SCC AS according to the registration capability of the UE1;

in 203, the SCC AS anchors that originating call request to make preparations for the subsequent handover;

in 204, the SCC AS then returns the originating call request to the I-CSCF or the S-CSCF of the calling network;

in 205, the I-CSCF or the S-CSCF of the calling network routes the originating call request to an S-CSCF of a called network according to the called user number;

in 206, the S-CSCF of the called network routes the originating call request to the called user UE2;

in 207, the UE2, after receiving the originating call request, sends 180 ringing to the calling user UE1 indicating that the called UE2 has received the request, wherein, the response finally reaches the UE1 along the path of the request from back to front through the S-CSCF of the called network, the I-CSCF or S-CSCF of the calling network, the SCC AS, and the I-CSCF or S-CSCF of the calling network;

in 208, at the moment, due to the change of the position, the UE1 receives a test report of the CS network indicating that the CS network has better signals, and it is necessary to hand over the conversation of the PS to the CS network;

in 209, an access stratum network element (such as MME) informs an MSC, and the MSC initiates a handover request to the IMS network or initiates a handover request through an MGCF (Media Gateway Control Function), wherein the request information passes through the I-CSCF or S-CSCF of the calling network;

in 210, the I-CSCF or S-CSCF of the calling network sends the handover request to the SCC AS;

in 211, the SCC AS, after receiving the handover request, finds the ongoing call of the UE1 to update according to the content in the request, and sends an update request to the S-CSCF of the called network through the I-CSCF or S-CSCF of the calling network to mainly update the media type and sending address of the calling UE1;

in 212, the S-CSCF of the called network, after receiving the update request, updates the call which is ongoing with the UE1;

in 213, the UE2, after completing the update, sends a update completion response to the S-CSCF of the called network;

in 214, the S-CSCF of the called network returns the update completion response to the SCC AS through the I-CSCF or S-CSCF of the calling network;

in 215, the SCC AS, after receiving the update completion response, sends a handover completion response to the I-CSCF or S-CSCF of the calling network;

in 216, the I-CSCF or S-CSCF of the calling network sends the handover completion response to the MSC or sends to the MSC through the MGCF.

At the time, the handover is substantially completed. However, in this handover, the situation that there is a customized alerting tone in the call is not considered, especially, the situation that a customized alerting tone service is provided by a forking mode.

FIG. 3 is a simplified flow chart of providing a customized alerting tone service in the related art, including the following steps:

301, a UE1 initiates an originating call request which carries the media resource information of the UE1 and passes through an IMS network element;

302, the IMS network element routes the calling request to a Customized Alerting Tone Application Server (CAT AS) of the called network;

303, the CAT AS routes the calling request to the called UE2 through the IMS network element;

304, the CAT AS sends a response message of the originating call request to the UE1 by using a conversation 2, and the message carries the customized alerting tone media information and passes through the IMS network element;

305, the IMS network element forwards the response message sending by the CAT AS to the calling UE1, so as to make the UE1 and the CAT AS have been negotiated media resources providing the customized alerting tone service;

306, the UE2 sends the response message of the originating call request to the UE1 by using a conversation 1, and the message carries the media resource information for a normal conversation of UE2, passes through the IMS network element, the CAT AS, and the IMS network element, and reaches the UE1, so as to make the UE1 and the UE2 have been negotiated media resources for the normal conversation.

It can be seen from the above originating call flow that, when the UE1 negotiates with the UE2 the conversation media resource information (referring to as normal media resource information, using the conversation 1), the UE1 also negotiates with the CAT AS the customized alerting tone media resource information (using the conversation 2).

If the handover is performed according to the flow shown in FIG. 2, the SCC AS, after receiving the handover request, only updates the media resource information with the UE2, while the customized alerting tone media resource information is no longer updated. For an ongoing originating call, the calling user may have such an experience: when the phone is getting through, the calling hears the customized alerting tone displayed for him by the called, at the time, the position of the calling changes and it is necessary to hand over from the PS network to the CS network, and after the handover is completed, due to no updated customized alerting tone media, the customized alerting tone heard by the calling is suddenly off, while a normal ring does not display also; and at the time, the calling may think that the calling is failed, and may hang up the phone.

CONTENT OF THE INVENTION

An technical problem to be solved in the present invention is to provide a system and a method for handing over an alerting phase session with a customized alerting tone, which can realize to complete not only the update of the normal media resource but also the update of the customized alerting tone media when the alerting phase session is handed over from the PS network to the CS network, ensuring that experience of a calling user for the customized alerting tone service does not change.

In order to solve the above technical problem, the present invention provides a method for handing over an alerting phase session with a customized alerting tone, and when the alerting phase session with the customized alerting tone is handed over, a handover process comprises:

after a Service Centralization and Continuity Application Server (SCC AS) receives a handover request, if the SCC AS judges that a session to be handed over is the alerting phase session and a forking occurs so that there are a customized alerting tone session and a normal media negotiation session, then correlating the handover request with the customized alerting tone session and the normal media negotiation session; and the SCC AS assisting to complete a handover to the normal media negotiation session and a handover to the customized alerting tone session.

Preferably, the step of the SCC AS correlating the handover request with the customized alerting tone session and the normal media negotiation session comprises:

after the creation of the normal media negotiation session and the customized alerting tone session is completed, the SCC AS correlating the normal media negotiation session with the customized alerting tone session, and after receiving the handover request, correlating the handover request with the normal media negotiation session and the customized alerting tone session again; or the SCC AS, after receiving the handover request, correlating the handover request, the normal media negotiation session and the customized alerting tone session.

Preferably, the step of the SCC AS assisting to complete the handover to the normal media negotiation session and the handover to the customized alerting tone session comprises:

after the SCC AS receives the handover request sent from a Mobile Switching Center (MSC), firstly sending to a customized alerting tone application server (CAT AS) an update request of the customized alerting tone media session which carries Circuit Switch (CS) media resource information; and the CAT AS, after receiving the update request of the customized alerting tone media session, negotiating and updating the customized alerting tone media session, and then returning to the SCC AS an update response which carries customized alerting tone media resource information; and the SCC AS, which receives the update response, returning a handover request response carrying the customized alerting tone media resource information to the MSC through a Serving Call Session Control Function (S-CSCF); and after a called user replies an answer response, the SCC AS completing the handover to the normal media negotiation session by a third-party call control mode.

Preferably, the step of the SCC AS assisting to complete the handover to the normal media negotiation session and the handover to the customized alerting tone session comprises:

after the SCC AS receives the handover request sent from a Mobile Switching Centre (MSC), sending an update request of the normal media negotiation session which carries Circuit Switch (CS) media resource information, and forwarding the update request to a called user through a customized alerting tone application server (CAT AS), and returning a handover request response carrying information of the customized alerting tone media session to the MSC through a Serving Call Session Control Function (S-CSCF) after receiving an update completion response; the MSC, after receiving the handover request response, sending to the S-CSCF an invitation message which carries the information of the customized alerting tone media session; the S-CSCF forwarding the received invitation message to the SCC AS, the SCC AS forwarding the invitation message to the CAT AS, and the CAT AS completing the negotiation and update for the customized alerting tone media session and then returning to the SCC AS an update completion response of the customized alerting tone media session which carries customized alerting tone media resource information on the CAT AS; and the SCC AS forwarding the update completion response of the customized alerting tone media session to the MSC through the S-CSCF.

Preferably, the step of the SCC AS correlating the normal media negotiation session with the customized alerting tone session comprises: the SCC AS correlating the normal media negotiation session with the customized alerting tone session having the same session identifier, calling user information or calling number; and the step of the SCC AS correlating the handover request with the normal media negotiation session and the customized alerting tone session comprises: the SCC AS correlating the normal media negotiation session, the customized alerting tone session and the handover request having the same calling number.

The present invention also provides a method for handing over an alerting phase session with a customized alerting tone, and when the alerting phase session with the customized alerting tone is handed over, a handover process comprises:

after a Service Centralization and Continuity Application Server (SCC AS) receives a handover request, if the SCC AS judges that a session to be handed over is the alerting phase session and only a customized alerting tone session exists in that session, then firstly initiating a handover to the customized alerting tone session; and after the SCC AS receives an off-hook response of a called user, when the SCC AS judges that a normal media negotiation session included in the off-hook response is correlated with the previous customized alerting tone session, completing a handover to the normal media negotiation session.

Preferably, a principle of the SCC AS judging that the normal media negotiation session is correlated with the customized alerting tone session is that, two sessions have the same session identifier, calling user information, or calling number. Preferably, after the SCC AS receives the off-hook response of the called user, the method further comprises: the SCC AS completing the handover to the normal media negotiation session by a third-party call control mode.

The present invention also provides a system for handing over an alerting phase session with a customized alerting tone, comprising a Service Centralization and Continuity Application Server (SCC AS); wherein, the SCC AS is configured to: after receiving a handover request, if judging that a session to be handed over is the alerting phase session and a forking occurs so that there are a customized alerting tone session and a normal media negotiation session, then correlate the handover request with the customized alerting tone session and the normal media negotiation session; and assist to complete a handover to the normal media negotiation session and a handover to the customized alerting tone session.

Preferably, in order to correlate the handover request with the customized alerting tone session and the normal media negotiation session, the SCC AS is configured to:

after the creation of the normal media negotiation session and the customized alerting tone session is completed, correlate the normal media negotiation session with the customized alerting tone session, and after receiving the handover request, correlate the handover request, the normal media negotiation session and the customized alerting tone session again; or after the SCC AS receiving the handover request, correlate the handover request with the normal media negotiation session and the customized alerting tone session.

Preferably, the system further comprises a Mobile Switching Centre (MSC), a Serving Call Session Control Function (S-CSCF), and a customized alerting tone application server (CAT AS);

the process of the SCC AS assisting to complete the handover to the normal media negotiation session and the handover to the customized alerting tone session comprises:

the SCC AS, after receiving the handover request sent from the MSC, sending an update request of the normal media negotiation session which carries Circuit Switch (CS) media resource information, and forwarding the update request of the normal media negotiation session to a called user through the CAT AS; returning a handover request response carrying information of the customized alerting tone media session to the MSC through the S-CSCF after receiving an update completion response replied by the called user; the MSC, after receiving the handover request response, sending an invitation message which carries the information of the customized alerting tone media session, and forwarding the invitation message to the CAT AS through the S-CSCF and the SCC AS; the CAT AS completing the negotiation and update for the customized alerting tone media session after receiving the invitation message, and returning to the SCC AS an update completion response of the customized alerting tone media session which carries customized alerting tone media resource information on the CAT AS; and the SCC AS forwarding the update completion response of the customized alerting tone media session to the MSC through the S-CSCF.

Preferably, the system further comprises a Mobile Switching Centre (MSC), a Serving Call Session Control Function (S-CSCF), and a customized alerting tone application server (CAT AS);

the process of the SCC AS assisting to complete the handover to the normal media negotiation session and the handover to the customized alerting tone session comprises:

after the SCC AS receives the handover request sent from the MSC, firstly sending to the CAT AS an update request of the customized alerting tone media session which carries Circuit Switch (CS) media resource information; the CAT AS, after receiving the update request of the customized alerting tone media session, negotiating and updating the customized alerting tone media session, and then returning to the SCC AS an update response which carries customized alerting tone media resource information; and the SCC AS, which receives the update response, returning a handover request response which carries the customized alerting tone media resource information to the MSC through the S-CSCF; and after a called user replies an answer response, the SCC AS completing the handover to the normal media negotiation session by a third-party call control mode.

Preferably, the SCC AS correlates the normal media negotiation session with the customized alerting tone session having the same session identifier, calling user information or calling number; and the SCC AS correlates the normal media negotiation session, the customized alerting tone session and the handover request having the same calling number.

The present invention also provides a system for handing over an alerting phase session with a customized alerting tone, comprising a Service Centralization and Continuity Application Server (SCC AS); wherein, the SCC AS is configured to: after receiving a handover request, if judging that a session to be handed over is the alerting phase session and only a customized alerting tone session exists in that session, then firstly initiate a handover to the customized alerting tone session; and, after having receiving an off-hook response of a called user, when judging that a normal media negotiation session included in the off-hook response is correlated with the previous customized alerting tone session, complete a handover to the normal media negotiation session.

Preferably, a principle of the SCC AS judging that the normal media negotiation session is correlated with the customized alerting tone session is that, two sessions have the same session identifier, calling user information, or calling number.

Preferably, after the SCC AS receives the off-hook response of the called user, the SCC AS completes the handover to the normal media negotiation session by a third-party call control mode.

In conclusion, the present invention provides a system and a method for handing over an alerting phase session with a customized alerting tone; for a call using a forking mode to play the customized alerting tone media, when handover from a PS network to a CS network occurs, the present invention not only completes the update of the calling request session, but also completes the update of the customized alerting tone media session; therefore, the service experience of the calling user for the customized alerting tone media service will not change, so that the normal call request is not affected, and modifications of the existing IMS architecture are not required, which is simple and feasible.

The present invention can be used in SRVCC and the handover from PS to CS in a normal SC.

BRIEF DESCRIPTION OF DRAWINGS

FIG. 4 is a flow chart of handover of an alerting phase session with a customized alerting tone of embodiment one of the present invention;

FIG. 5 is a flow chart of handover of an alerting phase session with a customized alerting tone of embodiment two of the present invention;

FIG. 6 is a flow chart of handover of an alerting phase session with a customized alerting tone of embodiment three of the present invention.

PREFERRED EMBODIMENTS OF THE PRESENT INVENTION

Figure 1:
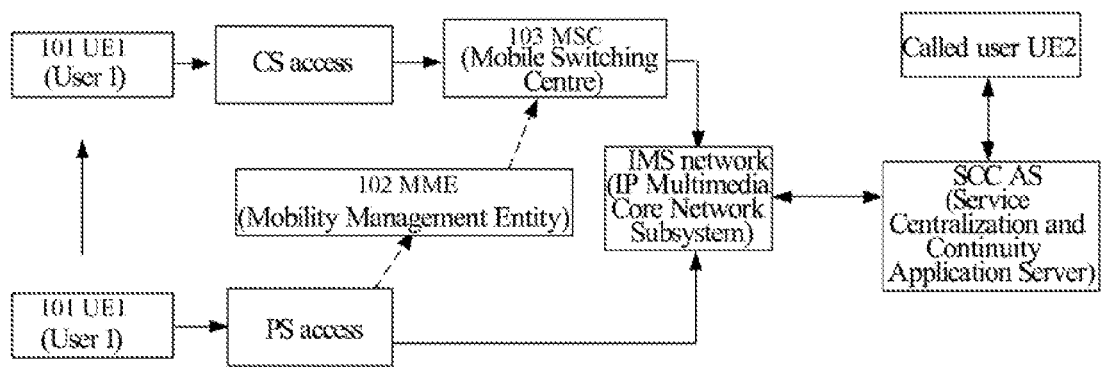
FIG. 1 is a handover architecture in the related art.
Figure 2:
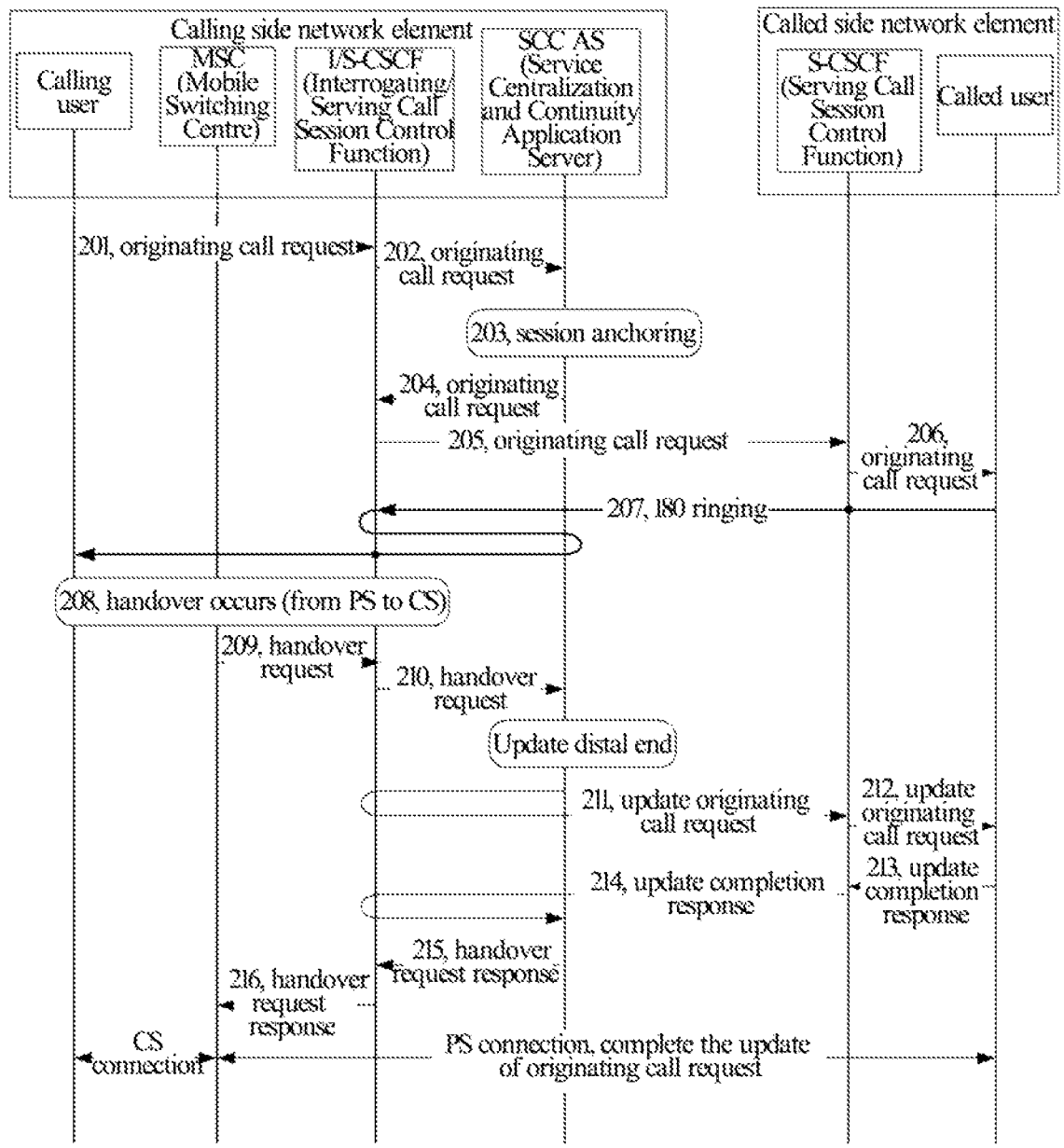
FIG. 2 is a flow chart of handover of an alerting phase session in the related art.
Figure 3:
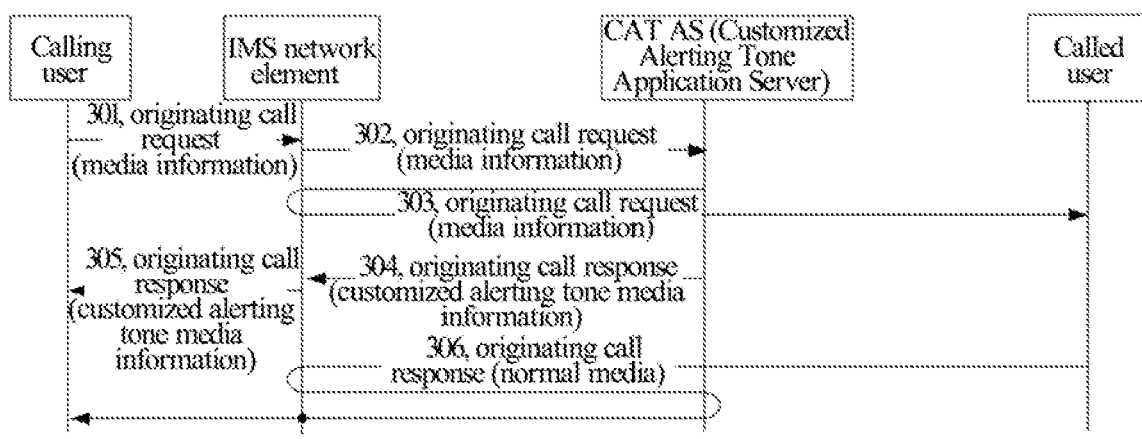
FIG. 3 is a simplified flow chart of providing a customized alerting tone service in the related art.
Figure 7:
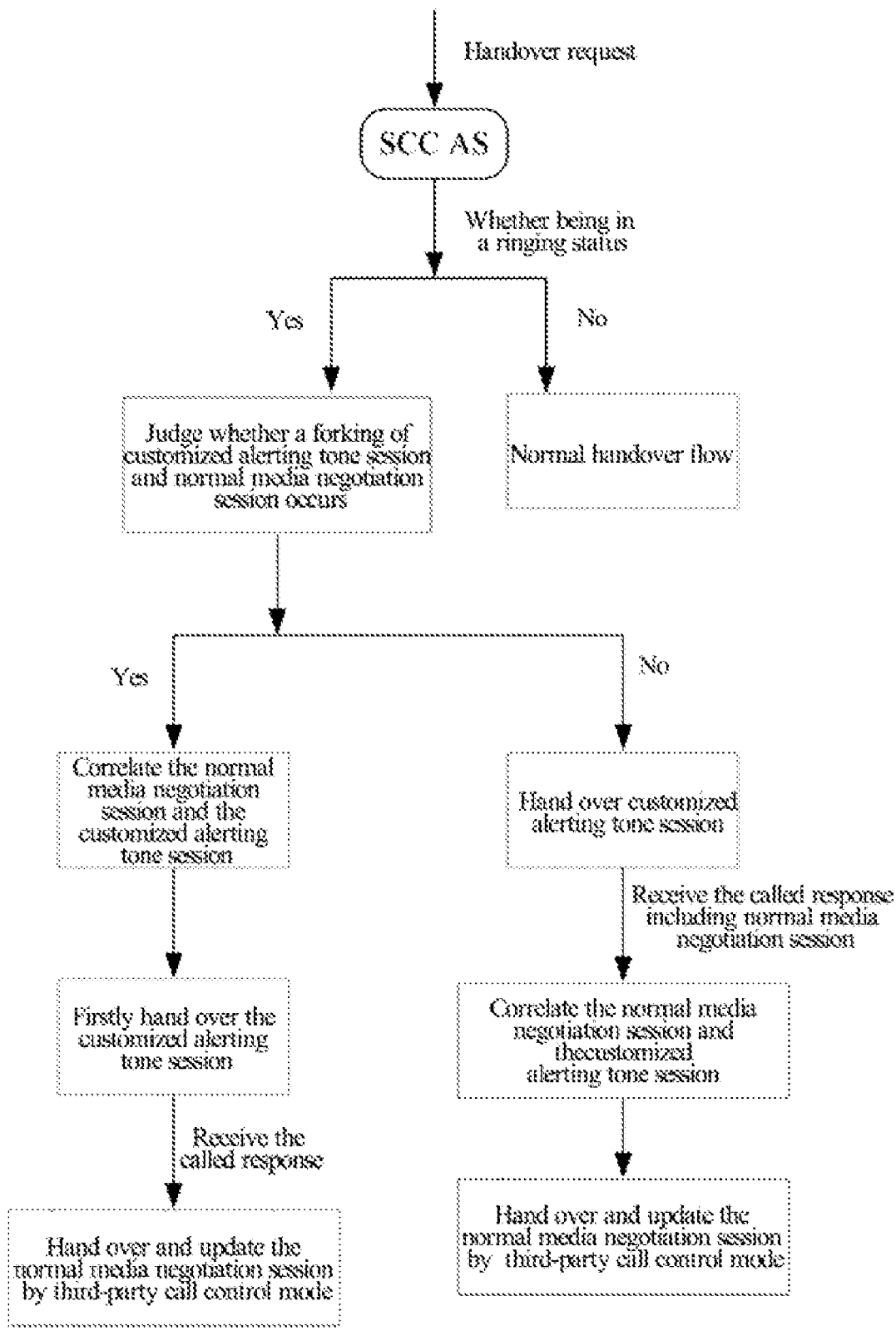
FIG. 7 is a flow chart of a method for handing over an alerting phase session with a customized alerting tone of the present invention.

Hereinafter, the present invention will be further illustrated in detail in combination with the accompanying drawings and specific embodiments.

The present invention provides a system for handing over an alerting phase session with a customized alerting tone, comprising an MSC, a CAT AS, an SCC AS, an S-CSCF and an called user;

the SCC AS is configured to, after receiving a handover request, correlate the handover request with a customized alerting tone session and a normal media negotiation session; and assist to complete a handover to the customized alerting tone session.

The process of the SCC AS correlating the handover request with the customized alerting tone session and the normal media negotiation session comprises: after the creation of the normal media negotiation session and the customized alerting tone session is completed, the SCC AS correlating the normal media negotiation session with the customized alerting tone session, and after receiving the handover request, correlating the handover request with the normal media negotiation session and the customized alerting tone session again; or the SCC AS, after receiving the handover request, correlating the handover request, the normal media negotiation session and the customized alerting tone session.

When the SCC AS correlates the normal media negotiation session with the customized alerting tone session, it can correlates the normal media negotiation session with the customized alerting tone session having the same session identifier, calling user information or calling number; when the SCC AS correlates the handover request with the customized alerting tone session and the normal media negotiation session, it can correlates the normal media negotiation session, the customized alerting tone session and the handover request having the same calling number.

The process of the SCC AS assisting to complete the handover of the normal media negotiation session and the handover of the customized alerting tone session comprises:

(a), the SCC AS, after receiving the handover request sent from the MSC, sending an update request of the normal media negotiation session which carries CS media resource information, and forwarding the update request of the normal media negotiation session to a called user through the CAT AS; returning a handover request response carrying information of the customized alerting tone media session to the MSC through the S-CSCF after receiving an update completion response replied by the called user; the MSC, after receiving the handover request response, sending an invitation message which carries the information of the customized alerting tone media session, and forwarding the invitation message to the CAT AS through the S-CSCF and the SCC AS; the CAT AS completing the negotiation and update for the customized alerting tone media session after receiving the invitation message, and returning to the SCC AS an update completion response of the customized alerting tone media session which carries customized alerting tone media resource information on the CAT AS; and the SCC AS forwarding the update completion response of the customized alerting tone media session to the MSC through the S-CSCF;

(b), after the SCC AS receives the handover request sent from the MSC, firstly sending to the CAT AS an update request of the customized alerting tone media session which carries Circuit Switch (CS) media resource information; the CAT AS, after receiving the update request of the customized alerting tone media session, negotiating and updating the customized alerting tone media session, and then returning to the SCC AS an update response which carries customized alerting tone media resource information; and the SCC AS, which receives the update response, returning a handover request response which carries the customized alerting tone media resource information to the MSC through the S-CSCF; and after a called user replies an answer response, the SCC AS completing the handover to the normal media negotiation session by a third-party call control (3PCC) mode.

The present invention also provides a method for handing over an alerting phase session with a customized alerting tone. When the alerting phase session is handed over, the SCC AS, after receiving a handover request, correlates the handover request with the customized alerting tone session and the normal media negotiation session; and the SCC AS assists to complete the handover of the normal media negotiation session and the handover of the customized alerting tone session.

The method of the present invention will be described in detail hereinafter in combination with the accompanying drawings and several embodiments.

Embodiment One

FIG. 4 is a flow chart of the handover of an alerting phase session with a customized alerting tone of embodiment one of the present invention. When a handover request is received, the SCC AS initiates update for the customized alerting tone media session, and thus the handover from a PS network to a CS network is realized under the conditions of no effect to user service experience. In the embodiment, a normal calling adopts a session 1 for negotiation, and a customized alerting tone media adopts a session 2 for negotiation, wherein, in the present invention, the session 1 is referred to as the "normal media negotiation session" and the session 2 is referred to as the "customized alerting tone session". As shown in FIG. 4, the flow comprises the following steps:

in 401, a calling UE1 initiates an originating call request carrying the media resource information of the UE1, and the message passes through an S-CSCF;

in 402, the S-CSCF forwards the originating call request to an SCC AS;

in 403, the SCC AS anchors the originating call request;

in 404, the SCC AS then sends the originating call request to the S-CSCF;

in 405, the S-CSCF routes the originating call request to a called user network, and the S-CSCF of the called user network forwards to a CAT AS;

in 406, then the CAT AS sends the originating call request to the called user UE2 through the S-CSCF of the called network;

in 407, the CAT AS, after receiving the originating call request and discovering that the calling supports a customized alerting tone service, replies an originating call response message carrying customized alerting tone media resource information to the calling by using the session 2, and;

in 408-410, the SCC AS anchors on the SCC AS the information of the replied session 2 sent by the CAT AS and through the I/S-CSCF of the calling network, and forwards the originating call response message to the calling UE1;

in 411, the UE2, after receiving the originating call request, sends an originating call response carrying the normal session media resource information of the UE2 user (referring to as the normal media negotiation session of the UE2, by using the session 1);

in 412-414, the SCC AS forwards the originating call response message sent by the UE2 to the calling UE1;

in 415, when the position of the calling user is changed, and a handover condition is met, the MSC sends a handover request to the IMS network, and the handover request carries the media resource information of the MSC (since it is used for connecting with the CS media, it is referred to as CS media resource information);

in 416, the S-CSCF forwards the handover request to the SCC AS;

in 417, the SCC AS, after receiving the above handover request and discovering that the calling user is in the alerting phase session with the customized alerting tone, correlates the handover request with the session 1 and session 2 which are created above; then initiates an update request of the session 2 (customized alerting tone media session) to the CAT AS, wherein the CS media resource information in step 415 is carried;

the correlating the handover request with the session 1 and session 2 can be correlating the handover request with the session 1 and session 2 three of which have the same calling number.

The SCC AS also can correlate two sessions of session 1 and session 2 after creation of the session 1 and session 2 is completed, for example, can correlate according to Call-ID, From Tag or calling number; and then, after receiving the handover request, correlates the handover request with the two correlated sessions according to the calling number.

In 418, the CAT AS, after receiving the update request of the session 2 (customized alerting tone media session), returns an update response carrying the customized alerting tone media resource information to the SCC AS, to complete the update of the customized alerting tone media.

In 419, the SCC AS, after receiving the update response, returns a handover request response carrying the customized alerting tone resource information to the S-CSCF, wherein the handover request response is a response to the handover request in step 416;

in 420, the S-CSCF forwards the received handover request response to the MSC.

At the time, the handover of the customized alerting tone media session form the PS network to the CS network is completed.

In 421, the called user makes a response, and sends 200 OK to the UE1; the response made by the called user is an off-hook response, i.e., final 200 OK, when the called user performs off-hook operation on a phone;

in 422, when the response message passes through the CAT AS, the CAT AS ends the display of the customized alerting tone;

in 423, the CAT AS forwards the 200 OK response message which passes through the SCC AS;

in 424, since the SCC AS correlates the session 1 (normal media negotiation session) and the session 2 (customized alerting tone media session) previously, the SCC AS delays to forward the 200 OK response to the calling UE1; the SCC AS initiates the update request of the session 1 (normal media negotiation session) by a third-party call control mode, and in this embodiment the SCC AS sends the update request to the UE2, but that update request does not carry the media resource information, and the update request passes through the CAT AS;

in 425, the CAT AS forwards the received update request to the UE2 through the S-CSCF of the called network;

in 426, the UE2 returns an update response carrying the media resource information for session of the UE2, and the message passes through the CAT AS;

in 427, the CAT AS forwards the received update response, and the message passes through the SCC AS;

in 428, the SCC AS sends the update request carrying the media resource information in step 426 to the UE1, and the message passes through the S-CSCF of the calling network;

in 429, the S-CSCF of the calling network forwards the received update request to the MSC;

in 430, the MSC returns the update response carrying the CS media resource information of the MSC to the UE2, and the message passes through the S-CSCF;

in 431, the S-CSCF forwards the received update response, and the message passes through the SCC AS;

in 432, the SCC AS sends an acknowledgment message (ACK) carrying the CS media resource information in step 431 to the UE2, and the message passes through the CAT AS;

in 433, the CAT AS forwards the received ACK to the UE2 through the S-CSCF of the called network;

in 434, the SCC AS returns the 200 OK response to the S-CSCF of the calling network;

the step can be performed after step 431, that is, it can be simultaneously performed with step 432.

In 435, the S-CSCF forwards the received 200 OK response to the MSC;

at the time, the calling UE1 and the called UE2 complete the calling handover, and can talk with each other.

From the above, steps 423-425 adopt the third-party call control mode, however, the implementation thereof is not just that flow, and also can adopt other flows to update the session between two ends. The present invention does not limit to any flow to be used specifically, and adopts the proper flow according to the particular situation.

Embodiment Two

FIG. 5 is a flow chart of handover of an alerting phase session with a customized alerting tone of embodiment two of the present invention. The SCC AS, when returning a handover completion response, informs the MSC that it is necessary to update the customized alerting tone media session, and then the MSC initiates update to the customized alerting tone media session; and the flow comprises the steps as follows:

in 501, a calling UE1 initiates an originating call request;

in 502, the S-CSCF forwards the originating call request to an SCC AS;

in 503, the SCC AS anchors the originating call request;

in 504, the SCC AS then sends the originating call request to the S-CSCF;

in 505, the S-CSCF routes the originating call request to a called user network;

in 506, the called network, after receiving the originating call request, forwards the request to the CAT AS, and then the CAT AS sends the originating call request to the called user UE2 through the called network;

in 507, the CAT AS, after receiving the originating call request and discovering that the calling supports a customized alerting tone service, replies an originating call response message carrying customized alerting tone media resource information to the calling by using the session 2;

in 508-510, the SCC AS forwards the originating call response message to the calling UE1 through the I/S-CSCF of the calling network;

in 511, the called UE2 makes a response to the originating call request by using the session 1;

in 512-514, the SCC AS anchors the response to the originating call request on the SCC AS, and forwards the response to the calling UE1;

in 515, when the position of the calling user is changed, and a handover condition is met, the MSC sends a handover request to the MS network, and the handover request carries the media resource information of the MSC (since it is used for connecting with the CS media, it is referred to as CS media resource information);

in 516, the S-CSCF forwards the handover request to the SCC AS;

in 517-518, the SCC AS, after receiving the above handover request and discovering that the calling user is in the alerting phase session with the customized alerting tone, correlates the handover request with the session 1 and session 2 which are created above; and then initiates an update request of the session 1 (normal media negotiation session) carrying the CS media resource information in step 515 to the called user;

the correlation of the handover request with session 1 and session 2 can be an correlation of the handover request having the same calling number with the session 1 and session 2.

the correlating the handover request with the session 1 and session 2 can be correlating the handover request with the session 1 and session 2 three of which have the same calling number.

The SCC AS also can correlate two sessions of session 1 and session 2 after creation of the session 1 and session 2 is completed, for example, can correlate according to Call-ID, From Tag or calling number; and then, after receiving the handover request, correlates the handover request with the two correlated sessions.

In 519, the UE2 performs negotiation and update to the session 1, and returns an update completion response of the session 1 carrying the media resource information of the UE2;

in 520, the CAT AS forwards the received update completion response of the session 1 to the SCC AS;

in 521, the SCC AS, after receiving the update completion response of the session 1, inserts therein the information of the customized alerting tone media session 2, and sends the update completion response inserted with the information of the customized alerting tone media session 2 to the S-CSCF through a handover request response message, wherein the information of the customized alerting tone media session 2 can be the ID of the customized alerting tone media session 2;

in 522, the S-CSCF forwards the received handover request response to the MSC;

in 523, the MSC sends to the S-CSCF a new invitation message carrying the received information of the customized alerting tone media session 2, such as the ID of the customized alerting tone media session 2 according to the information of the customized alerting tone media session 2 carried in the handover request response;

in 524, the S-CSCF forwards the received invitation message to the SCC AS;

in 525, the SCC AS receives the invitation message comprising the information of the customized alerting tone media session 2, and forwards the invitation message to the CAT AS, wherein the invitation message carries the received information of the customized alerting tone media session 2, such as the ID of the customized alerting tone media session 2;

in 526, the CAT AS performs the negotiation and update to the customized alerting tone media session 2, returns an update completion response of the customized alerting tone media session 2 to the SCC AS, wherein the customized alerting tone resource information on the CAT AS is carried in the response;

in 527, the SCC AS forwards the received update completion response of the customized alerting tone media session 2 to the S-CSCF;

in 528, the S-CSCF forwards the received update completion response of the customized alerting tone media session 2 to the MSC.

At the time, the update of both the session 1 (normal media negotiation session) and the session 2 (customized alerting tone media session) is completed.

Embodiment Three

FIG. 6 is a flow chart of the handover of an alerting phase session with a customized alerting tone of embodiment three of the present invention. In the embodiment, the normal media negotiation session occurs in a 200 OK response; before receiving a handover request, the SCC AS does not know the called has the forking of the customized alerting tone, thus just initiates the update to a customized alerting tone media session (session 2); and after receiving the 200 OK of the called, acquires a normal media negotiation session (session 1), and then correlates the normal media negotiation session and the customized alerting tone media session and initiates a handover and update for the normal media negotiation session. As shown in FIG. 4, the flow comprises the following steps:

in 601, a calling UE1 initiates an originating call request carrying a media resource information Session Description Protocol (SDP) request of the UE1, and the message passes through an S-CSCF;

in 602, the S-CSCF forwards the originating call request to an SCC AS;

in 603, the SCC AS anchors the originating call request;

in 604, the SCC AS then sends the originating call request to the S-CSCF;

in 605, the S-CSCF routes the originating call request to a called user network, and the S-CSCF of the called user network forwards to a CAT AS;

in 606, then the CAT AS sends the originating call request to the called user UE2 through the S-CSCF of the called network;

in 607, the called user UE-2 replies an originating call request response to the calling UE1 by using session 1, wherein the response does not include the media information of the UE2, i.e., the SDP information;

in 608, the CAT AS, after receiving the response message of the UE2, replaces it to an early media response (session 2), and replies the originating call response message carrying a customized alerting tone media resource information SDP response to the calling UE1;

in 609-611, the SCC AS anchors on the SCC AS the information of the early media response (session 2) sent by the CAT AS through the I/S-CSCF of the calling network, and forwards the originating call response message to the calling UE1;

in 612, when the position of the calling user is changed, and the handover condition is met, the MSC sends to the IMS network a handover request carrying the media resource information of the MSC (since it is used for connected with the CS media, it is referred to as the CS media resource information);

in 613, the S-CSCF forwards the handover request to the SCC AS;

in 614, the SCC AS receives the above handover request, discovers that the calling user is in the alerting phase session with the customized alerting tone, and only anchors the early media session 1, then the CAT AS initiates an update request of the session 2 (customized alerting tone media session) carrying the CS media resource information in step 612;

in 615, the CAT AS, after receiving the update request of the session 2 (customized alerting tone media session), returns an update response carrying customized alerting tone media resource information to the SCC AS, to complete the update of the customized alerting tone media.

In 616, the SCC AS, after receiving the update response, returns a handover request response carrying the customized alerting tone media resource information to the S-CSCF, and the handover request response is a response to the handover request in step 613;

in 617, the S-CSCF forwards the received handover request response to the MSC.

At the time, the handover of the customized alerting tone media session form the PS network to the CS network is completed.

In 618, the called user replies and sends a 200 OK response to the UE1, wherein the response carries the media information SDP response of the called user, and the normal media negotiation session 1 is used;

when the response message passes through the CAT AS, the CAT AS ends the display of the customized alerting tone;

in 619, the CAT AS forwards the 200 OK response message, and the message passes through the SCC AS;

in 620, the SCC AS determines that the session 1 (the normal media negotiation session) and the session 2 (customized alerting tone media session) are correlated, then the principle of correlating the session 1 and the session 2 can be that, they have the same calling number, and they have the same Call-ID and From Tag; and the SCC AS delays forwarding the 200 OK response to the UE1. The update request of the session 1 (normal media negotiation session) is initiated by the third-party call control mode, and specifically, the SCC AS can use the SDP information received in the 200 OK, and initiates the update to the previous handover request.

In 621, the S-CSCF forwards the received update handover request to the MSC;

in 622, the MSC replies an update response carrying the SDP response of the CS media to the received update handover request;

in 623, the S-CSCF sends the update response to the SCC AS;

in 624-625, the SCC AS, after receiving the update response, initiates a re-negotiation request to the called user UE2, wherein the re-negotiation request carries the SDP information in the received update response, which acts as a new SDP request to send to the UE2;

in 626-627, the UE2 replies the 200 OK carrying the SDP response of the normal media;

in 628-629, the SCC AS sends an acknowledgement message (ACK) to the UE2.

In the above solution, steps 619-629 adopt the third-party call control mode, however, the implementation thereof is not just that flow, and also can adopt other flows to update the session between two ends. The present invention does not limit to any flow to be used specifically, and adopts the proper flow according to the particular situation.

In conclusion, with the technical solution of the present invention, the handover from the PS network to the CS network for a ongoing call with the customized alerting tone media can be realized only by improving functions of the part of the network elements, without making modifications to the existing IMS architecture.

INDUSTRIAL APPLICABILITY

The present invention provides a system and a method for handing over an alerting phase session with a customized alerting tone; for a call using a forking mode to play the customized alerting tone media, when handover from a PS network to a CS network occurs, the present invention not only completes the update of the normal media resource, but also completes the update of the customized alerting tone media; therefore, the service experience of the calling user for the customized alerting tone media service will not change, thereby not effecting the normal call request, and not requiring to modify the existing IMS architecture, so that it is simple and feasible. The present invention can be used in SRVCC and the handover from PS to CS in a normal SC.

What we claim is:

1. A method for session handing over in alerting phase when having a customized alerting tone comprising:
a Service Centralization and Continuity Application Server (SCC AS) receiving a handover request sent from a Mobile Switching Centre (MSC);
when the said SCC AS determining a session to be handed over is in alerting phase and concurrent negotiation for a normal media session and a customized alerting tone session exists, then said SCC AS setting up the correlation between the handover request, the customized alerting tone session, and the normal media negotiation session; and
the said SCC AS assisting to complete a handover to the normal media negotiation session and a handover to the customized alerting tone session.

2. The method according to claim 1, wherein, the step of the SCC AS correlating the handover request with the customized alerting tone session and the normal media negotiation session comprises:
after the creation of the normal media negotiation session and the customized alerting tone session is completed, the SCC AS correlating the normal media negotiation session with the customized alerting tone session, and after receiving the handover request, correlating the handover request with the normal media negotiation session and the customized alerting tone session again; or the SCC AS, after receiving the handover request, correlating the handover request, the normal media negotiation session and the customized alerting tone session.

3. The method according to claim 1, wherein, the step of the SCC AS assisting to complete the handover to the normal media negotiation session and the handover to the customized alerting tone session comprises:

the said SCC AS sending an update request carrying Circuit Switch (CS) media resource information to a customized alerting tone application server (CAT AS) for the customized alerting tone media session;

the said CAT AS negotiating and updating the customized alerting tone media session, and then responding to the SCC AS an update response carrying customized alerting tone media resource information;

the said SCC AS returning a handover request response carrying the customized alerting tone media resource information to the said MSC through a Serving Call Session Control Function (S-CSCF);

after the called user answering the call, the said SCC AS completing the handover to the normal media negotiation session through a three parties call control mode.

4. The method according to claim 1, wherein, the step of the SCC AS assisting to complete the handover to the normal media negotiation session and the handover to the customized alerting tone session comprises:

after the SCC AS receives the handover request sent from a Mobile Switching Centre (MSC), sending an update request of the normal media negotiation session which carries Circuit Switch (CS) media resource information, and forwarding the update request to a called user through a customized alerting tone application server (CAT AS), and returning a handover request response carrying information of the customized alerting tone media session to the MSC through a Serving Call Session Control Function (S-CSCF) after receiving an update completion response; the MSC, after receiving the handover request response, sending to the S-CSCF an invitation message which carries the information of the customized alerting tone media session; the S-CSCF forwarding the received invitation message to the SCC AS, the SCC AS forwarding the invitation message to the CAT AS, and the CAT AS completing the negotiation and update for the customized alerting tone media session and then returning to the SCC AS an update completion response of the customized alerting tone media session which carries customized alerting tone media resource information on the CAT AS; and the SCC AS forwarding the update completion response of the customized alerting tone media session to the MSC through the S-CSCF.

5. The method according to claim 2, wherein, the step of the SCC AS correlating the normal media negotiation session with the customized alerting tone session comprises: the SCC AS correlating the normal media negotiation session with the customized alerting tone session having the same session identifier, calling user information or calling number; and the step of the SCC AS correlating the handover request with the normal media negotiation session and the customized alerting tone session comprises: the SCC AS correlating the normal media negotiation session, the customized alerting tone session and the handover request having the same calling number.

6. A method for session handing over in alerting phase when having a customized alerting tone comprising:

a Service Centralization and Continuity Application Server (SCC AS) receiving a handover request;

when the said SCC AS determining a session to be handed over is in alerting phase and only a customized alerting tone session exists in that session, then said SCC AS initiating a handover to the customized alerting tone session; and after the said SCC AS receiving an off-hook response from the called user, the said SCC AS determining whether that a normal media negotiation session included therein is correlated with the previous customized alerting tone session; if yes, then said SCC AS completing a handover to the normal media negotiation session.

7. The method according to claim 6, wherein, a principle of the SCC AS judging that the normal media negotiation session is correlated with the customized alerting tone session is that, two sessions have the same session identifier, calling user information, or calling number.

8. The method according to claim 6, wherein, after the SCC AS receives the off-hook response of the called user, the method further comprises: the SCC AS completing the handover to the normal media negotiation session via a three parties call control mode.

9. A system for session handing over in alerting phase when having a customized alerting tone, comprising a Service Centralization and Continuity Application Server (SCC AS); wherein, the said SCC AS is configured to: after receiving a handover request, when it determines a session to be handed over is in alerting phase and concurrent negotiation for a normal media session and a customized alerting tone session exists, then said SCC AS setting up the correlation between the handover request, the customized alerting tone session, and the normal media negotiation session; and the said SCC AS assisting to complete a handover to the normal media negotiation session and a handover to the customized alerting tone session.

10. The system according to claim 9, wherein, in order to correlate the handover request with the customized alerting tone session and the normal media negotiation session, the SCC AS is configured to:

after the creation of the normal media negotiation session and the customized alerting tone session is completed, correlate the normal media negotiation session with the customized alerting tone session, and after receiving the handover request, correlate the handover request, the normal media negotiation session and the customized alerting tone session again; or after receiving the handover request, correlate the handover request with the normal media negotiation session and the customized alerting tone session.

11. The system according to claim 9, wherein, the system further comprises a Mobile Switching Centre (MSC), a Serving Call Session Control Function (S-CSCF), and a customized alerting tone application server (CAT AS);

the process of the SCC AS assisting to complete the handover to the normal media negotiation session and the handover to the customized alerting tone session comprises:

the SCC AS, after receiving the handover request sent from the MSC, sending an update request of the normal media negotiation session which carries Circuit Switch (CS) media resource information, and forwarding the update request of the normal media negotiation session to a called user through the CAT AS; returning a handover request response carrying information of the customized alerting tone media session to the MSC through the S-CSCF after receiving an update completion response replied by the called user; the MSC, after receiving the handover request response, sending an invitation message which carries the information of the customized alerting tone media session, and forwarding the invitation message to the CAT AS through the S-CSCF and the SCC AS; the CAT AS completing the negotiation and update for the customized alerting tone media session after receiving the invitation message, and returning to the SCC AS an update completion response of the customized alerting tone media session which carries customized alerting tone media resource information on the CAT AS; and the SCC AS forwarding the update completion response of the customized alerting tone media session to the MSC through the S-CSCF.

12. The system according to claim 9, wherein, the system further comprises a Mobile Switching Centre (MSC), a Serving Call Session Control Function (S-CSCF), and a customized alerting tone application server (CAT AS);

the process of the SCC AS assisting to complete the handover to the normal media negotiation session and the handover to the customized alerting tone session comprises:

after the SCC AS receives the handover request sent from the MSC, firstly sending to the CAT AS an update request of the customized alerting tone media session which carries Circuit Switch (CS) media resource information; the CAT AS, after receiving the update request of the customized alerting tone media session, negotiating and updating the customized alerting tone media session, and then returning to the SCC AS an update response which carries customized alerting tone media resource information; and the SCC AS, which receives the update response, returning a handover request response which carries the customized alerting tone media resource information to the MSC through the S-CSCF; and after a called user replies an answer response, the SCC AS completing the handover to the normal media negotiation session by a third-party call control mode.

13. The system according to claim 10, wherein, the SCC AS correlates the normal media negotiation session with the customized alerting tone session having the same session identifier, calling user information or calling number; and the SCC AS correlates the normal media negotiation session, the customized alerting tone session and the handover request having the same calling number.

14. A system for session handing over in alerting phase when having a customized alerting tone, comprising a Service Centralization and Continuity Application Server (SCC AS); wherein, the said SCC AS is configured to: after receiving a handover request, when it determines a session to be handed over is in alerting phase session and only a customized alerting tone session exists in that session, then said SCC AC initiate a handover to the customized alerting tone session; and after the said SCC AS receiving an off-hook response from the called user, the said SCC AS determining whether that a normal media negotiation session included therein is correlated with the previous customized alerting tone session; if yes, then said SCC AS completing a handover to the normal media negotiation session.

15. The system according to claim 14, wherein, a principle of the SCC AS judging that the normal media negotiation session is correlated with the customized alerting tone session is that, two sessions have the same session identifier, calling user information, or calling number.

16. The system according to claim 14, wherein, after the SCC AS receives the off-hook response of the called user, the SCC AS completes the handover to the normal media negotiation session via a three parties call control mode.

* * * * *